(12) United States Patent
Zhang et al.

(10) Patent No.: US 11,463,164 B1
(45) Date of Patent: Oct. 4, 2022

(54) OPTICAL LINE TERMINAL WITH OUT-OF-BAND COMMUNICATION CHANNEL, AND METHOD FOR IMPLEMENTING

(71) Applicant: CABLE TELEVISION LABORATORIES, INC., Louisville, CO (US)

(72) Inventors: Junwen Zhang, Shanghai (CN); Zhensheng Jia, Superior, CO (US); Curtis D. Knittle, Superior, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/384,722

(22) Filed: Jul. 24, 2021

Related U.S. Application Data

(60) Provisional application No. 63/055,953, filed on Jul. 24, 2020.

(51) Int. Cl.
*H04B 10/079* (2013.01)
*H04B 10/40* (2013.01)
*H04J 14/02* (2006.01)

(52) U.S. Cl.
CPC ......... *H04B 10/0793* (2013.01); *H04B 10/40* (2013.01); *H04J 14/023* (2013.01); *H04J 14/0223* (2013.01)

(58) Field of Classification Search
None
See application file for complete search history.

(56) References Cited

U.S. PATENT DOCUMENTS

| 6,417,943 | B1 * | 7/2002 | Saraswat | H04Q 11/0062 |
| | | | | 398/75 |
| 8,320,760 | B1 * | 11/2012 | Lam | H04J 14/0282 |
| | | | | 398/68 |

(Continued)

OTHER PUBLICATIONS

Montgomery et al., A Review of MAC Protocols for All-Optical Networks, 2007, 9 pages.

(Continued)

*Primary Examiner* — Darren E Wolf
(74) *Attorney, Agent, or Firm* — Lathrop GPM LLP

(57) ABSTRACT

A method for implementing an out-of-band communication channel in a coherent optical access network includes steps (a)-(e). Step (a) includes separating a MAC-layer signal received from a media access control (MAC) layer into an initial communication-channel signal and an initial data-channel signal. Step (b) includes encoding, using a first signal-coding scheme within a transceiver of a coherent passive optical network (PON), the initial communication-channel signal into a communication-channel signal occupying a first frequency band. Step (c) includes encoding, using a second signal-coding scheme within the transceiver, the initial data-channel signal into a data-channel signal occupying a second frequency band not overlapping the first frequency band. Step (d) includes combining the communication-channel signal and the data-channel signal to yield an analog signal. Step (e) includes driving, with the analog signal, an optical modulator to modulate a coherent optical signal for output on a fiber optical path of the coherent PON.

13 Claims, 10 Drawing Sheets

(56) References Cited

U.S. PATENT DOCUMENTS

| | | | | |
|---|---|---|---|---|
| 2008/0232804 A1* | 9/2008 | Absillis | ............... | H04J 3/14 |
| | | | | 398/71 |
| 2010/0221000 A1* | 9/2010 | Yang | ............... | H04B 10/272 |
| | | | | 398/38 |
| 2015/0373430 A1* | 12/2015 | Kim | ............... | H04Q 11/0067 |
| | | | | 398/48 |

OTHER PUBLICATIONS

Weik, supervisory signaling, Computer Science and Communications Dictionary, 2000, Springer, Boston, MA, 2 pages.
Weik, signaling, Computer Science and Communications Dictionary, 2000, Springer, Boston, MA, 2 pages.
Weik, separate-channel supervisory signaling, Computer Science and Communications Dictionary, 2000, Springer, Boston, MA, 2 pages.
Weik, out-of-band signaling, Computer Science and Communications Dictionary, 2000, Springer, Boston, MA, 2 pages.

* cited by examiner

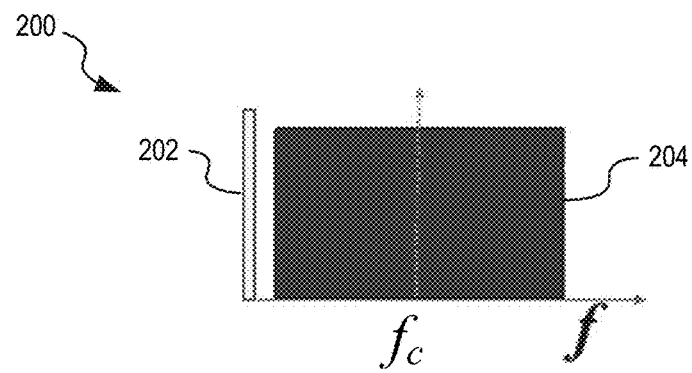
FIG. 2
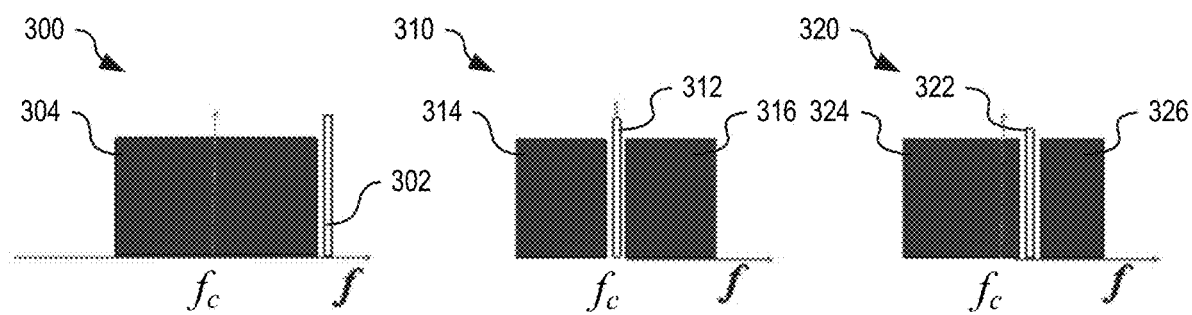
FIG. 3A  FIG. 3B  FIG. 3C
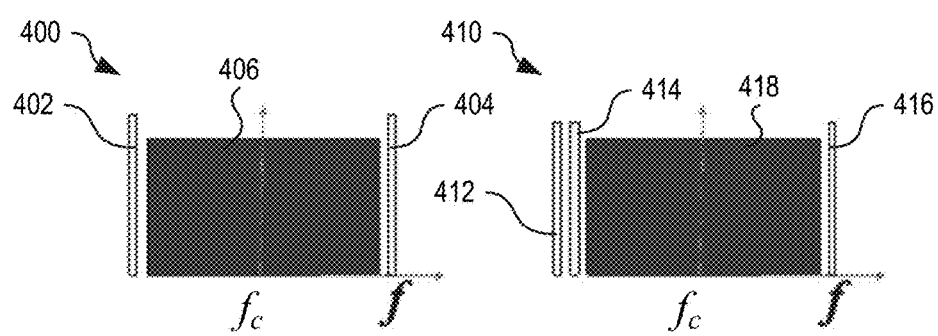
FIG. 4A  FIG. 4B

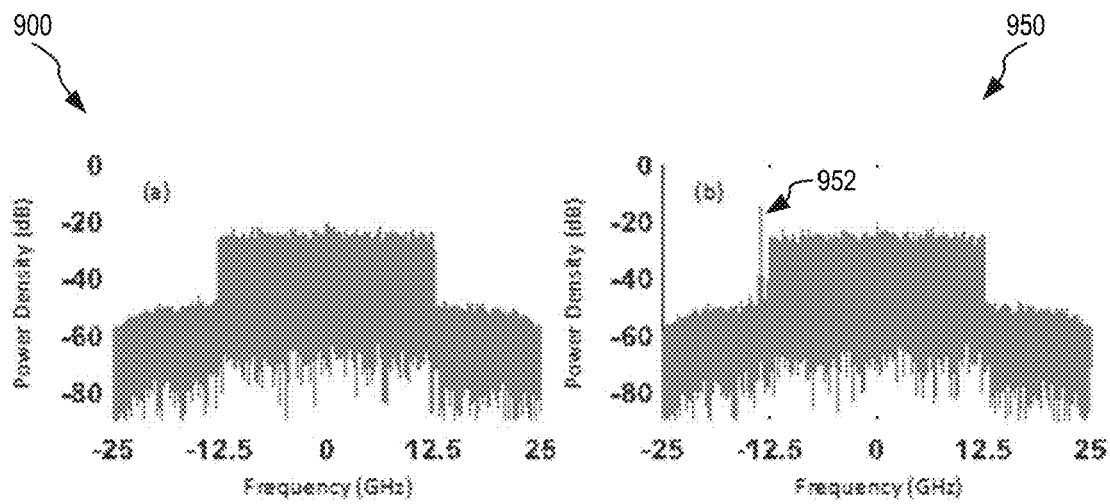
FIG. 9A  FIG. 9B
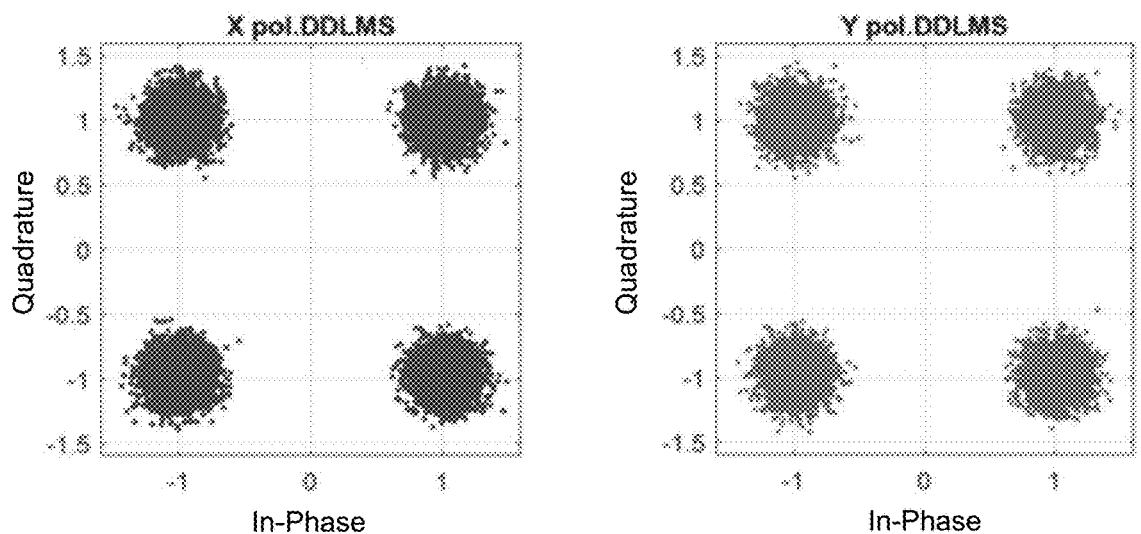
FIG. 10A  FIG. 10B
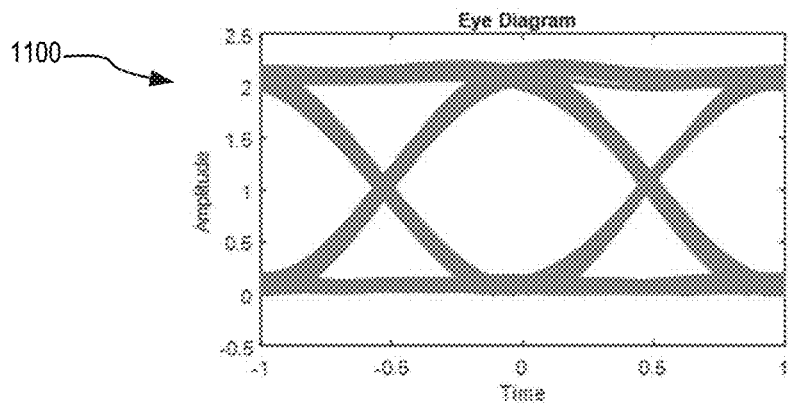
FIG. 11

OPTICAL LINE TERMINAL WITH OUT-OF-BAND COMMUNICATION CHANNEL, AND METHOD FOR IMPLEMENTING

RELATED APPLICATIONS

This application claims priority to U.S. Patent Application Ser. No. 63/055,953, titled "Out-Of-Band Communication Channel in Coherent Optical Access Network," filed Jul. 24, 2020, and incorporated herein by reference.

BACKGROUND

Access networks, such as a passive optical network (PON), have been undergoing significant technology and architecture developments driven by the ever-increasing residential data service growth rate and an increasing number of services types being supported, such as business services and cellular connectivity. According to Nielsen's Law, a high-end user will need 10 Gbps in 2023 and 100 Gbps by 2029. Currently, 10-Gb/s passive optical networks (XG-PON or IEEE 10G-EPON) are being deployed for high-bandwidth applications. A 40-Gb/s PON based on time and wavelength division multiplexing (TWDM) has been standardized and the IEEE 802.3ca Task Force is finalizing a 50-Gb/s Ethernet PON with 25-Gb/s data rate per lane. However, in the move towards future PON or access optical systems supporting more than 50 Gb/s per channel, current direct detection optical schemes face huge challenges to achieve the same power budget because they have low receiver sensitivity and limited options for long-term upgrades, especially in the legacy fiber environment where operators continue to use existing infrastructure to avoid costly fiber re-trenching.

SUMMARY

To improve the access data rate or bandwidth capacity, coherent detection is used for a high-speed time-division multiplexed (TDM) PON to achieve over 100 Gb/s. In its physical layer, the coherent PON enables high-speed data transmission with advanced modulation formats, and further enhances the link power budget due to increased sensitivity. With a higher power budget, the coherent PON may support up to 1024 subscribers with a doubled transmission distance as compared to a traditional non-coherent PON.

The present embodiments include the realization that when supporting a large number of users, a registration process over the coherent TDM-PON incurs large latency and significantly reduces the network efficiency. A further realization is that a specific communication channel that allows TDMA without the penalty of a "discovery" period, which is a detriment to latency and causes jitter, would greatly improve efficiency of the coherent TDM-PON. The present embodiments solve this problem with a method for providing an out-of-band communication channel in a coherent optical access network. The method adds, modulates and detects an out-of-band communication channel together with a data channel in the coherent optical access network that may provide point-to-point or point-to-multi-point connectivity. The method allows the communication channel to be independent of rates and/or modulation formats of the line signals and may concurrently transmit both data and communication channel on different frequencies. To reduce crosstalk between the data channel and the communication channel, the method may include pulse shaping to optimize the channel bandwidth occupancy. Advantageously, for coherent access networks, a separate communication channel increases flexibility and improves efficiency of data transmission.

The proposed method inserts a separate out-of-band communication channel, generally with a smaller bandwidth than the data channel, to carry specific channel information. The method may use different modulation formats, line-coding, and forward error correction (FEC) for the communication channel as compared to the data channel. Both the communication channel and the data channel are simultaneously generated, detected, and processed in a digital domain without imposing any additional higher requirement on the opto-electronic devices within the coherent transceiver, in terms of analog bandwidth and sampling rate, that are unique to "coherent."

The channel information carried by the communication channel may be all, or a portion of, (a) media access control (MAC) layer data, (b) channel control signaling data, (c) Operation, Administration, and Maintenance (OAM) management information, and so on. For example, in TDM-PON, the communication channel may carry the complete Multi-Point Control Protocol (MPCP) or a portion of the MPCP.

Because of the independence of the communication channel from the data channel, the data channel and the communication channel may serve for data (user) plane and control plane, respectively.

In one example implementation, the data-channel signal using quadrature phase shift keying (QPSK) modulation for 100G high-speed data transmission, and the low-speed communication channel uses Non-Return-to-Zero (NRZ) modulation.

Specifically, the proposed method may work uniquely in the upstream burst reception of coherent PON systems.

In a first aspect, a method for implementing an out-of-band communication channel in a coherent optical access network is disclosed. The method includes a separating step, a first encoding step, a second encoding step, a combining step, and a driving step. The separating step includes separating a MAC-layer signal received from a media access control (MAC) layer into an initial communication-channel signal and an initial data-channel signal. The first encoding step includes encoding, using a first signal-coding scheme within a transceiver of a coherent passive optical network (PON), the initial communication-channel signal into a communication-channel signal occupying a first frequency band. The second encoding step includes encoding, using a second signal-coding scheme within the transceiver, the initial data-channel signal into a data-channel signal occupying a second frequency band that does not overlap the first frequency band. The combining step includes combining the communication-channel signal and the data-channel signal to yield an analog signal. The driving step includes driving, with the analog signal, an optical modulator to modulate a coherent optical signal for output on a fiber optical path of the coherent PON. In a second aspect, an optical line terminal includes a digital signal processor and circuitry that controls the digital signal processor to execute the method of the first aspect.

BRIEF DESCRIPTION OF THE FIGURES

FIG. 2 is a schematic frequency-domain representation of the optical signal of the PON of FIG. 1 showing one example OOB communication-channel signal and a data-channel signal, in embodiments.

FIGS. 3A, 3B, and 3C are frequency-domain representations showing example positions for the OOB communication-channel signal, in embodiments.

FIG. 4A is a schematic frequency-domain representation showing two example communication-channel signals and a data-channel signal, in embodiments.

FIG. 4B is a schematic frequency-domain representation showing three communication-channel signals and one data-channel signal, in embodiments.

FIG. 9A is a graph showing one example power spectrum of the simulated data-channel signal of FIG. 1 implemented as a 100G signal without a communication-channel signal, in embodiments.

FIG. 9B is a graph showing an example power spectrum of the simulated data-channel signal implemented as a 100G signal and a simulated communication-channel signal implemented as 400 M, in embodiments.

FIG. 10A and FIG. 10B show example constellations of X and Y polarizations of data-channel signal for 100G QPSK, respectively, in embodiments.

FIG. 11 shows one example eye-diagram of the communication-channel signal, in embodiments.

DETAILED DESCRIPTION OF THE EMBODIMENTS

Figure 1:
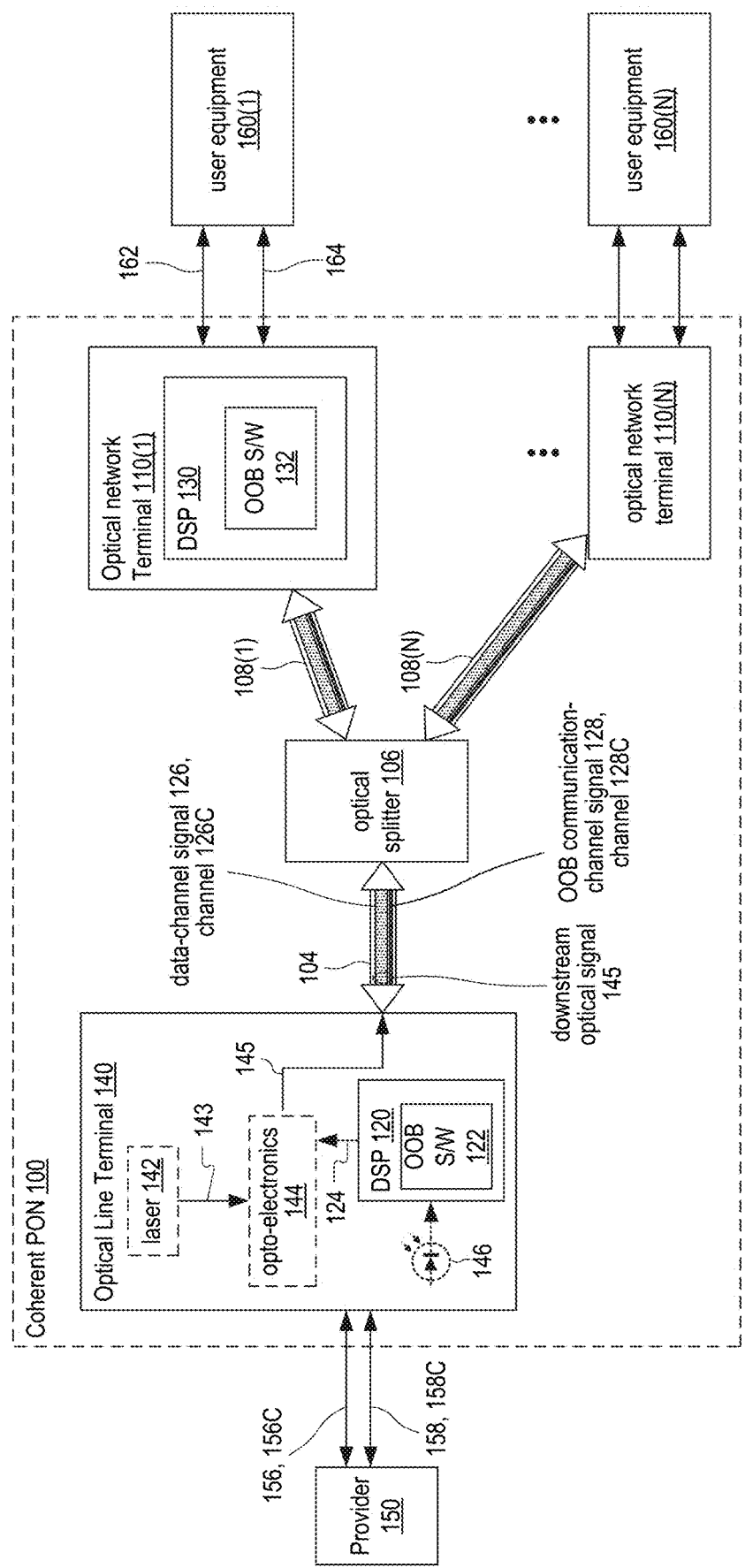
FIG. 1 shows one example coherent passive optical network (PON) with an out-of-band (OOB) communication channel, in embodiments.

FIG. 1 shows one example coherent passive optical network (PON) 100 with a data channel 126C and an out-of-band (OOB) communication channel 128C. Coherent PON 100 includes an optical line terminal (OLT) 140, a primary fiber cable 104, an optical splitter 106, a plurality of secondary fiber cables 108, and a plurality of optical network terminals (ONTs) 110. For downstream traffic, OLT 140 generates a downstream optical signal 145 that travels along primary fiber cable 104 to optical splitter 106, which splits downstream optical signal 145 into the plurality of secondary fiber cables 108 such that each ONT 110 receives and decodes downstream optical signal 145. In embodiments, optical splitter 106 is a passive optical component.

Downstream optical signal 145 includes a data-channel signal 126 and an OOB communication-channel signal 128. Data channel 126C denotes the spectral band of data-channel signal 126. OOB communication channel 128C denotes the spectral band of OOB communication-channel signal 128.

In embodiments, OLT 104 includes at least one of a laser 142, opto-electronics 144, and a photodetector 146, which may be a coherent detector. Laser 142 generates a carrier signal 143. Downstream optical signal 145 is carrier signal 143 with a data-channel signal 126 and an OOB communication-channel signal 128 modulated thereon by opto-electronics 144. In embodiments, DSP 120 processes output from photodetector 146 to generates a signal 124 that drives opto-electronics 144, e.g., a modulator thereof. Signal 124 includes signals 126 and 128, or analog representations thereof when signal 124 is an analog signal.

In embodiments, laser 142 is part of an optical-frequency comb generator of OLT 140, and carrier signal 143 is a single channel of the generated optical frequency comb. In embodiments, opto-electronics 144 is part of laser 142, and DSP 120 may directly modulate laser 142.

For upstream traffic, each ONT 110 cooperates (e.g., using time division multiplexing TDM) to generate an upstream optical signal on its secondary fiber cable 108 and optical splitter 106 transfers the upstream optical signal to primary fiber cable 104 where it is received and decoded by OLT 140. The following description is for downstream traffic; however, the functional steps may equally apply to upstream traffic. OLT 140 includes at least one digital signal processor (DSP) 120 that controls modulation of optical signal 145 based on the information to be carried. ONT 110 includes a DSP 130 for detecting and decoding the received information.

In one example of use, a provider 150 (e.g., a video streaming service) uses PON 100 to deliver data (e.g., stream video) to each of a plurality of user equipment 160. In embodiments, provider 150 delivers the data via a data channel 156C and uses a communication channel 158C for channel information, such as all, or a portion of, (a) MAC layer data, (b) channel control signaling data, (c) Operation, Administration, and Maintenance (OAM) management information, and so on. In embodiments, provider 150 delivers data and channel information in a same channel.

Data channel 156C and communication channel 158C denote respective spectral bands of a data signal 156 and a communication signal 158 transmitted from provider 150 to OLT 140. In embodiments, signals 126 and 128 are equal to, or derived from, signals 156 and 158 respectively. Photodetector 146 detects signals 156 and 158, which are received by DSP 120.

A conventional OLT of a conventional TDM-PON encodes the communication channel and the data channel within the same band of the optical signal, thereby the communication channel data disrupts the flow of information of the data channel, as noted above. The larger the number of subscribers using the TDM-PON, the greater the information carried by the communication channel and the greater the disruption to the flow of information in the data channel. OLT 140 includes OOB software 122 that implements OOB communication channel 128C/158C independently of data channel 126C/156C within optical signal 145. Accordingly, data channel 126C incurs no, or less, disruption from communication channel 128C/158C when transported over primary fiber cable 104 and each of the plurality of secondary fiber cables 108. Each ONT 110 includes OOB software 132 that controls DSP 130 to decode the detected OOB communication channel 128C independently of data channel 126C. As shown, ONT 110 outputs data channel 162 and communication channel 164 to user equipment 160.

OLT 140 has a digital signal processor (DSP) 112 that includes OOB software 122 that enhances OLT 140 to implement an OOB communication-channel signal 202, described below. Each ONT 110 has a DSP 116 that includes OOB software 132 that enhances ONT 110 to implement OOB communication-channel signal 202. For downstream data flow, optical splitter 106 splits optical signal 145 received over primary fiber cable 104 into N secondary fiber cables 108(1–N), such that the optical signal is received by ONTs 110(1–N), respectively. For upstream data flow, each ONT 110, e.g., one ONT 110 at a time in embodiments, transmits a return optical signal down the corresponding secondary fiber cable 108 and optical splitter 106 transfers the return optical signal onto primary fiber cable 104 to be received by OLT 140.

FIG. 2 is a schematic frequency-domain representation 200 of optical signal 145 showing one example OOB communication-channel signal 202 and a data-channel signal 204 modulated onto a single carrier signal with a carrier frequency L. OOB communication-channel signal 202 corresponds to OOB communication channel 128C of FIG. 1, and data-channel signal 204 corresponds to data channel 126C. In this example, OOB communication-channel signal 202 is positioned below data-channel signal 204. That is, the frequencies of communication-channel signal 202 closer to DC (zero frequency) than frequencies of frequency band of data-channel signal 204.

In prior art PONs, MAC layer signals, channel control signals, operations, administration, and maintenance (OAM) management information are transferred in-band, thereby adding overhead to the data channel. To avoid this overhead, the present embodiments use OOB communication-channel signal 202 to carry all, or a portion, of MAC layer signals, channel control signals, OAM management information, and so on.

OOB communication-channel signal 202 has a narrow spectral bandwidth (e.g., narrower than the bandwidth of data-channel signal 204) and is independent of data-channel signal 204 to ensure the communication connectivity among multiple optical endpoints is independent of the status of data-channel signal 204. In embodiments, data-channel signal 204 is used in a deterministic manner for data only, or data with a reduced portion of overhead for MAC signal or other control and OAM information. This dedicated, and independent, communication channel enables more flexibility and higher efficiency data transmission.

FIGS. 3A, 3B, and 3C are schematic frequency-domain representations 300, 310, and 320, showing example spectral positions for OOB communication channels, each of which is located in a different frequency band from the data channel (or multiple data channels). That is, the OOB communication channel may be inserted at different locations relative to the data channel. For example, FIG. 3A shows an OOB communication-channel signal 302 positioned above (further from DC, zero Hertz) a data-channel signal 304. FIG. 3B shows a communication-channel signal 312 positioned between two data-channel signals 314 and 316 of equal size. FIG. 3C shows a communication-channel signal 322 positioned between two data-channel signals 324 and 326 of different sizes. Communication-channel signal 322 is located out-of-band, that is, outside of respective spectral bands of each of data-channel signals 324 and 326, and in embodiments has a very narrow bandwidth compared with either of data-channel signals 324 and 326.

In FIGS. 2 and 3, there is only one communication channel. However, in certain embodiments, there may be two or more out-of-band communication channels, depending on the application and the transmitter and receiver capabilities. FIG. 4A is a schematic frequency-domain representation 400 showing two example communication-channel signals 402 and 404 and a data-channel signal 406, where communication-channel signal 402 is positioned at a lower frequency than data-channel signal 406 and communication-channel signal 404 is positioned at a higher frequency that data-channel signal 406. FIG. 4B is a schematic frequency-domain representation 410 showing the use of three communication-channel signals 412, 414, 416 and one data-channel signal 418.

Implementation Examples

Data Flow

Figure 5:
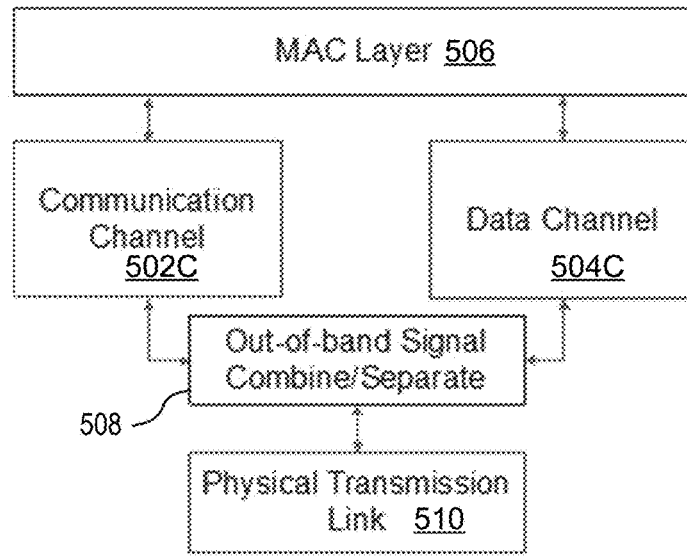
FIG. 5 is a high-level block diagram illustrating example signal flow for an OOB communication channel and a data channel, in embodiments.

FIG. 5 is a high-level block diagram illustrating example signal flow for an OOB communication channel 502C and a data channel 504C. OOB communication channel 502C may represent OOB communication channel 128C/158C of FIG. 1 and data channel 504C may represent data channel 126C/156C. Data channel 504C and OOB communication channel 502C work independently for each channel's signal generation. For signal generation and transmitting, the data from MAC layer 506 are separated to OOB communication channel 502C and data channel 504C, respectively. OOB communication channel 502C and data channel 504C, e.g., respective signals thereof, are then generated separately from each other and mapped to different non-overlapping frequency channels before they are combined, in block 508. For signal detection and receiving, the signal from physical link 510 is first separated into two signals that are then processed separately as part of OOB communication channel 502C and data channel 504C respectively. Data from OOB communication channel 502C and data channel 504C are then transferred to MAC layer 506.

Signal Processing Flow in Transmitter Side

Figure 6:
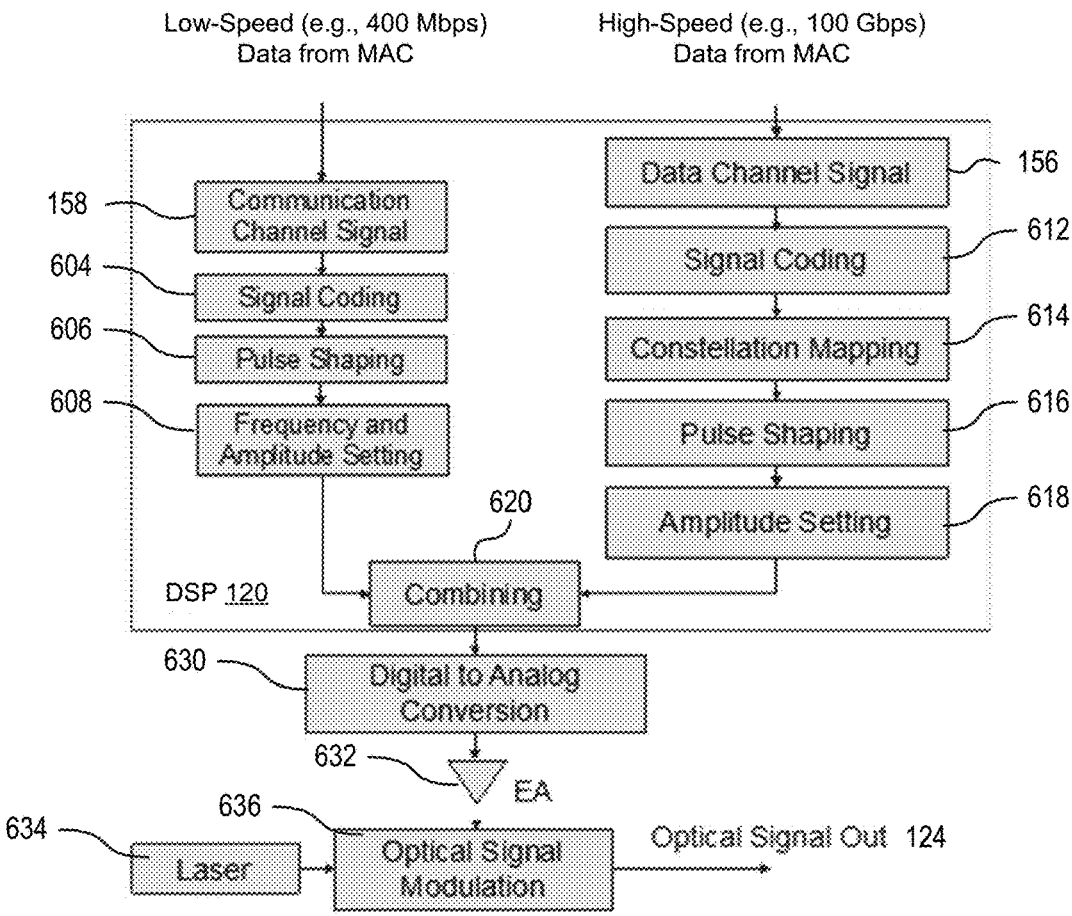
FIG. 6 is a block diagram illustrating example data flow and processing of the communication channel and the data channel within the optical line terminal (OLT) of FIG. 1 to generate the optical signal for transmission from the OLT, in embodiments.

FIG. 6 is a block diagram illustrating example data flow and processing of communication channel 128C/158C and data channel 126C/156C within OLT 140 to generate optical signal 145 for transmission from OLT 140. In this example, optical signal 145 is assumed to have characteristics shown in FIG. 2. Within DSP 120, communication signal 158 and data signal 156 are independently digitally processed (e.g., using OOB software 122) to generate digital signals that are digitally combined 620, converted 630 to an analog signal, amplified 632 by an electrical amplifier (EA), and used to optically modulate 636 coherent light from a laser 634 to generate optical signal 145.

Within OLT 140, signals of communication channel 158C and data channel 156C are received separately from MAC layer 506 (see FIG. 5). DSP 120 independently codes (signal coding 604 for OOB communication-channel signal 128 and signal coding 612 for data-channel signal 126) each of communication channel 158C and data channel 156C and maps the coded signals to a desired frequency band or bands with specific frequency and amplitude (or power) values (frequency and amplitude setting 608 for OOB communication-channel signal 128 and amplitude setting 618 for data-channel signal 126). For example, data-channel signal 126 is coded and mapped in baseband, whereby there is no need for frequency setting (e.g., the center frequency is set as zero). In this example, only one band of communication is used; however, as described above, additional sub-band communication channels may be similarly implemented.

OOB communication-channel signal 128 is generated in the digital domain and frequency up-converted to the desired band. As mentioned above, there may be more than one communication channel. Accordingly, OOB software 122 may provide two or more sub-paths for communication-channel signal generation.

Since OOB communication-channel signal 128 is independent from data-channel signal 126 (spectrally non-overlapping), OOB software 122 may use different signal-coding schemes. For example, OOB software 122 may use one or more different modulation formats, different line-coding, and different forward error correction (FEC) coding, to generate OOB communication-channel signal 128 and data-channel signal 126. In certain embodiments, OOB software 122 may use the same coding scheme for both OOB communication-channel signal 128 and data-channel signal 126. For example, data-channel signal 126 may be generated using modulation by any one of QPSK, 8QAM, 16QAM, and so on, whereas OOB communication-channel signal 128 may be generated using modulation by any one of unipolar NRZ, bipolar NRZ, BPSK, and so on. In certain embodiments, differential coding is used for data-channel signal 126 or OOB communication-channel signal 128.

Since OOB communication-channel signal 128 only requires a low-speed and narrow bandwidth data transmission, the resources required of DSP 120 for processing communication channel 128C/158C is much smaller that the resources required of the DSP for processing data channel 126C/156C. For example, 100-500 Mbps is sufficient for a communication channel of a 100G coherent data transmission. Therefore, bandwidth of the communication channel may be appropriately selected to match the internal clock rate of the DSP chip, which simplifies design by not requiring the DEP chip to have an additional clock regime.

To improve performance and reduce crosstalk between data-channel signal 126 and OOB communication-channel signal 128, DSP 120 may implement pulse shaping (e.g., pulse shaping 606 for OOB communication-channel signal 128 and pulse shaping 616 for data-channel signal 126) such as one or both of raised cosine pulse shaping and square root raised cosine pulse shaping.

Advantageously, OOB communication-channel signal 128 and data-channel signal 126 may be generated in the same DSP chip (e.g., DSP 120), and converted to an analog signal by digital to analog conversion (DAC) 630.

Figure 7:
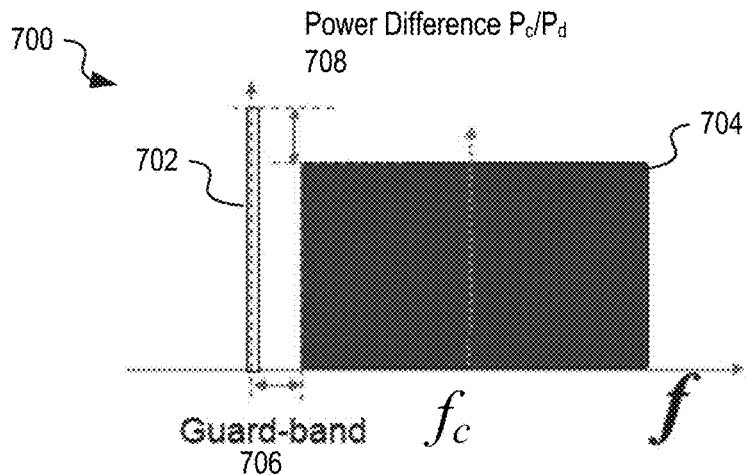
FIG. 7 is a schematic frequency-domain representation showing example guard band and power difference that is optimized to achieve the required signal-to-noise ratio of the data-channel signal and cross-talk between the OOB communication-channel signal and the data-channel signal, in embodiments.

FIG. 7 is a schematic frequency-domain representation 700 showing an example guard band 706 and power difference 708 that is optimized to achieve the required signal-to-noise ratio of data-channel signal 704 and cross-talk between OOB communication-channel signal 702 and data-channel signal 704. OOB communication-channel signal 702 may represent OOB communication-channel signal 128 of FIG. 1, and data-channel signal 704 may represent data-channel signal 126. Adding OOB communication channel 128C may change the power distribution, which changes the effective signal-to-noise ratio of data-channel signal 126. Guard band 706 may be added between OOB communication-channel signal 128 and data-channel signal 126 to minimize or avoid crosstalk therebetween. Accordingly, the frequency and amplitude (or power) of OOB communication-channel signal 128 may be optimized (during design, a calibration stage, or in real time) with respect to data-channel signal 126, to provide an appropriate guard band and power difference.

OOB communication channel 128C may be upconverted to a desired frequency and then added to data-channel signal 126 using analog signal processing (e.g., combining 620). In one example, OOB communication channel is upconverted to a higher frequency by using a mixer with a radio frequency (RF) source. In certain embodiments, data-channel signal 126 and OOB communication-channel signal 128 may be amplified separately and then added together to form an analog signal that is used for optical signal modulation 636.

OOB communication-channel signal 128 is generated and processed independently of data-channel signal 126, and after signal coding and the appropriate (optimized) frequency and amplitude setting, OOB communication-channel signal 128 and data-channel signal 126 are combined 620 into an analog signal that may be amplified 632 and used for optical signal modulation 636.

In certain embodiments, Communication channel 158C functions without data channel 156C. Accordingly, the combining of data-channel signal 126 with OOB communication-channel signal 128 is not needed. In other embodiments, only data channel 156C may be present, such as when the task of communication channel 158C is complete. That is, communication channel 158C (and corresponding OOB communication-channel signal 128) may be turned on or turned off according to a status of the data being conveyed (e.g., a status of provider 150).

Realization in Receiver-Side

At the receiver-side (e.g., in each ONT 110 for downstream traffic or OLT 140 for upstream traffic) of coherent PON 100, the processing sequence is substantially the reverse of the sequence at the transmitter-side (e.g., in OLT 140 as described above for FIG. 6). Advantageously, both OOB communication-channel signal 128 and data-channel signal 126 detection is realized in a single receiver, as shown in FIG. 8.

Figure 8:
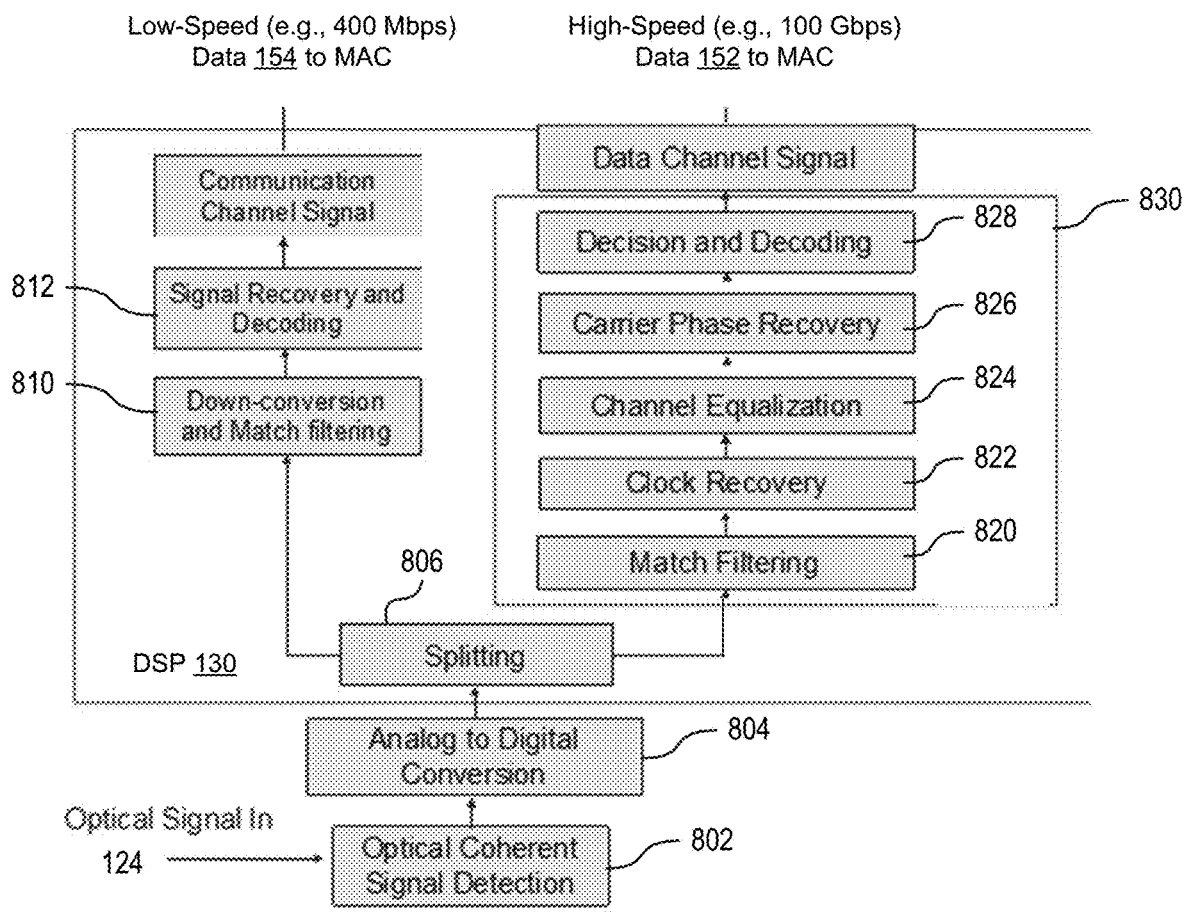
FIG. 8 is a block diagram illustrating example data flow and functional steps in the processing of the optical signal received at the optical network terminal (ONT) of FIG. 1 to concurrently recover the OOB communication channel and the data channel, in embodiments.

FIG. 8 is a block diagram illustrating example data flow and functional steps in the processing of optical signal 145 received at ONT 110 to concurrently recover communication channel 158C and data channel 156C. Particularly, FIG. 8 shows differences between conventional (prior art) coherent DSP processing, and processing defined by OOB software 132 to support communication channel 158C. Optical coherent signal detection 802 receives optical signal 145 and generates an analog signal that is input to analog to digital conversion 804 that converts the analog signal to a digital signal that is input to DSP 130. A splitter, implemented by OOB software 132 splits the digital signal into two processing paths through DSP 130. A first path provides recovery and decoding of OOB communication-channel signal 128, and the second path provides recovery and decoding of data-channel signal 126.

In the first path, to decode OOB communication-channel signal 128, down converting and match filtering 810 first down-converts the digital signal to a base band signal and the baseband signal is match filtered to reduce crosstalk from data-channel signal 126 and then signal recovery and decoding 812 regenerates information of communication channel 158C for output from ONT 110.

In the second path, for data-channel signal 126, match filtering 820 is applied to the digital signal (e.g., a base band signal) to reduce the crosstalk from the communication channel. The signal recovery process for data-channel signal 126 may include at least one of signal polarization recovery, clock recovery 822 and demultiplexing, channel equalization 824, frequency offset estimation and compensation, and carrier phase recovery 826. Decision and decoding 828 then outputs information of data channel 158C to the MAC layer. Blocks 820 through 828 may be similar to conventional DSP processing of coherent optical signals.

The first path (e.g., OOB communication-channel signal 128 processing) may include two or more sub-paths for different communication channels processing, depending on the communication-channel signal forms, as described above.

Especially for the first path (e.g., OOB communication-channel signal 128 processing), as described above for encoding transmission, different modulation formats may be used for OOB communication-channel signal 128 as compared with the modulation formats of data-channel signal 126. In certain embodiments, data-channel signal 126 is based on complex signal modulation, such as one of QPSK, QAM, and so on, whereas OOB communication-channel signal 128 may be based on simpler modulation formats, such as OOK/NRZ, BPSK, PAM, and so on. In certain embodiments, the signal recovery process of OOB communication-channel signal 128 may be simplified and not include phase recovery, or may include a simplified phase recovery.

In certain embodiments, for the first path (e.g., OOB communication-channel signal 128 processing) the digital signal may be separated and down-converted to base band using an analog frequency down conversion, such as where, for example, an RF product detector is used to do the frequency down-conversion. In another example, OOB communication-channel signal 128 may be separately detected and processed, since only low-speed data rate is carried by OOB communication-channel signal 128. In embodiments, OOB communication-channel signal 128 is demodulated and separated from data-channel signal 126 via coherent detection or via a low-bandwidth OOK detector.

In embodiments, DSP 120 independently processes data-channel signal 126 and OOB communication-channel signal 128. In certain embodiments, respective signals of the data channel and the communication channel detected may be generated from the same source (or same transmitter); however, they may not arrive at respective ONUs simultaneously because distances between the transmitter and different ONUs vary.

In certain embodiments, optical signal 145 may contain only OOB communication-channel signal 128 or only data-channel signal 126, depending on the link working conditions. For example, in an initial registration stage of a passive optical network 100, optical signal 145 may include only communication-channel signal 128 for hand-shake protocol exchange.

In yet other embodiments, communication-channel signal 128 and data-channel signal 126 are from different sources. For example, in coherent PON 100, data-channel signal 126 may come from one optical network terminal 110, and the detected OOB communication-channel signal 128 may come from a different optical network terminal 110.

Simulation Results

We simulated a 100G coherent data-channel signal with an OOB communication-channel signal on higher frequency. Data-channel signal 126 is simulated as a 25-GBaud signal with a polarization-division-multiplexing quadrature phase shift keying (PDM-QPSK) modulation format, with square root raised cosine pulse shaping and a roll-off factor of 0.02 to reduce the data channel bandwidth occupation. OOB communication-channel signal 128 is simulated as unipolar on-off-keying/non-return-to-zero (OOK/NRZ) modulation format with a data rate of about 400 Mbps. Since OOB communication channel 128C only requires a low-speed and narrow bandwidth data transmission, the resources required in DSP 112 for processing OOB communication channel 128C is less than the resources required in DSP 112 for processing of data-channel signal 126. For example, a data rate of between 100 Mbps and 500 Mbps is sufficient for a communication channel in 100G (100 Gbit/s) coherent data transmission. Accordingly, in embodiments, a 400 Mbps bandwidth is selected to match the internal clock rate of DSP 112, which in embodiments is 500 MHz.

FIG. 9A is a graph showing one example power spectrum 900 of the simulated data-channel signal 126 implemented as a 100G signal without a communication-channel signal. FIG. 9B is a graph showing an example power spectrum 950 of the simulated data-channel signal 126 implemented as a 100G signal and a simulated OOB communication-channel signal 128 implemented as 400 M. For this simulation example, the guard band (e.g., guard band 706, FIG. 7) between OOB communication-channel signal 128 and data-channel signal 126 is fully programmable and is set to 0.8 GHz. OOB communication-channel signal 128 is seen as a spike 952 in FIG. 9B, which is absent in FIG. 9A. The power of OOB communication-channel signal 128 and data-channel signal 126 is also fully programmable, and in this example the power ratio (e.g., $P_c/P_d$) between OOB communication-channel signal 128 and data-channel signal 126 is set as −14.5 dB.

Data-channel signal 126 is implemented as 100G polarization multiplexed QPSK signals, with 25G Baud rate. FIG. 10A and FIG. 10B show example signal constellations of horizontal and vertical polarizations of data-channel signal 126 for 100G QPSK, respectively. In FIGS. 10A and 10B, OOB communication-channel signal 128 is implemented as an on-off-key (OOK) modulated signal. FIG. 11 shows an example eye-diagram 1100 of OOB communication-channel signal 128.

Figure 12:
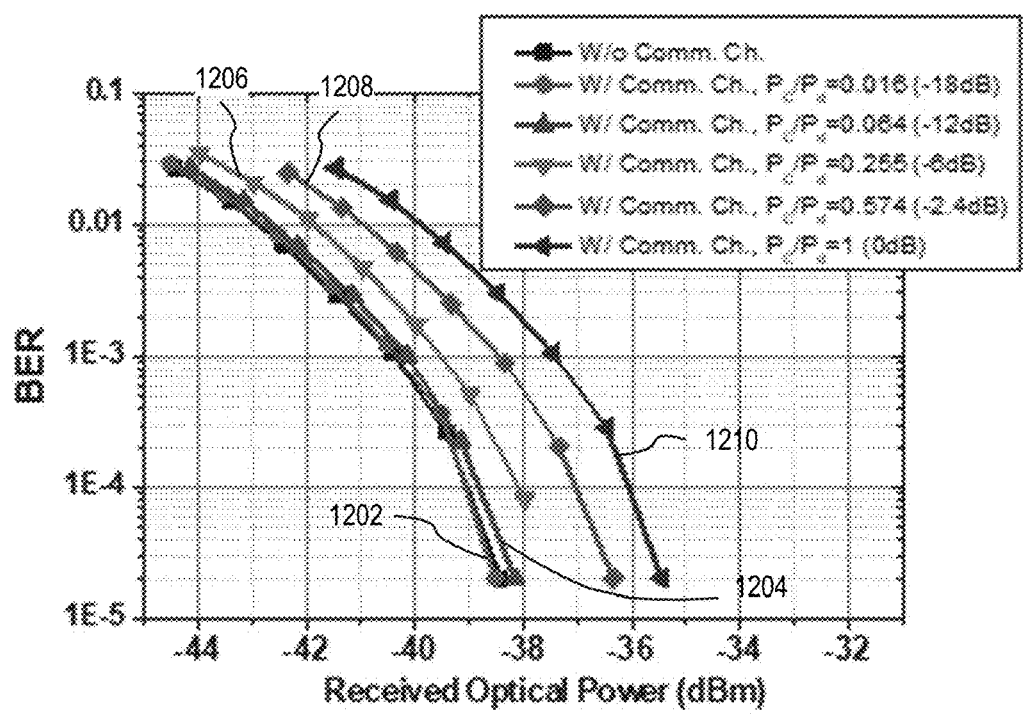
FIG. 12 is a graph showing bit-error-rate (BER) performances as a function of received optical power for −18 dB, −12 dB, −6 dB, −2.4 dB, and 0 dB power ratios ($P_c/P_d$) between the communication-channel signal and the data-channel signal, in embodiments.

As noted above, the introduction of OOB communication-channel signal 128 introduces a need to optimize guard band 706 in the frequency domain, and the power ratio ($P_c/P_d$) between OOB communication-channel signal 128 and data-channel signal 126. To evaluate performance, data-channel signal 126 and OOB communication-channel signal 128 are simulated at different power ratios and the bit-error-rate (BER) is determined. FIG. 12 is a graph showing BER performances as a function of received optical power for −18 dB (line 1202), −12 dB (line 1204), −6 dB (line 1206), −2.4 dB (line 1208), and 0 dB (line 1210) power ratios ($P_c/P_d$) between OOB communication-channel signal 128 and data-channel signal 126.

Figure 13:
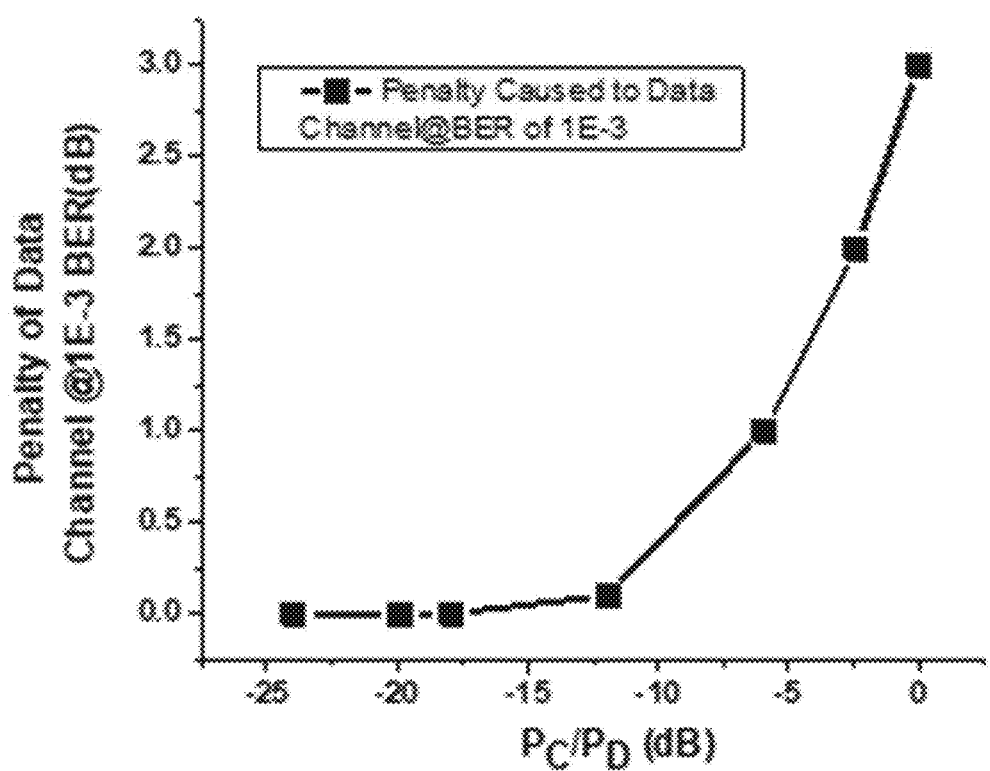
FIG. 13 is a graph showing results of the power penalty for the data-channel signal at a BER level of $1\times10^{-3w}$, as a function of power ratio $P_c/P_a$, in embodiments.

As shown in FIG. 12, when $P_c/P_d$ is less than −12 dB, there is no obvious penalty for data channel's sensitivity performance. However, when $P_c/P_d$ is larger than −6 dB, there is clearly a power penalty for the data channel. FIG. 13 is a graph showing results of the power penalty for data-channel signal 126 at a BER level of $1\times10^{-3}$, as a function of power ratio $P_c/P_d$. These results confirm that when $P_c/P_d$ is less than −12 dB, there is no significant power penalty for the data channel.

Figure 14:
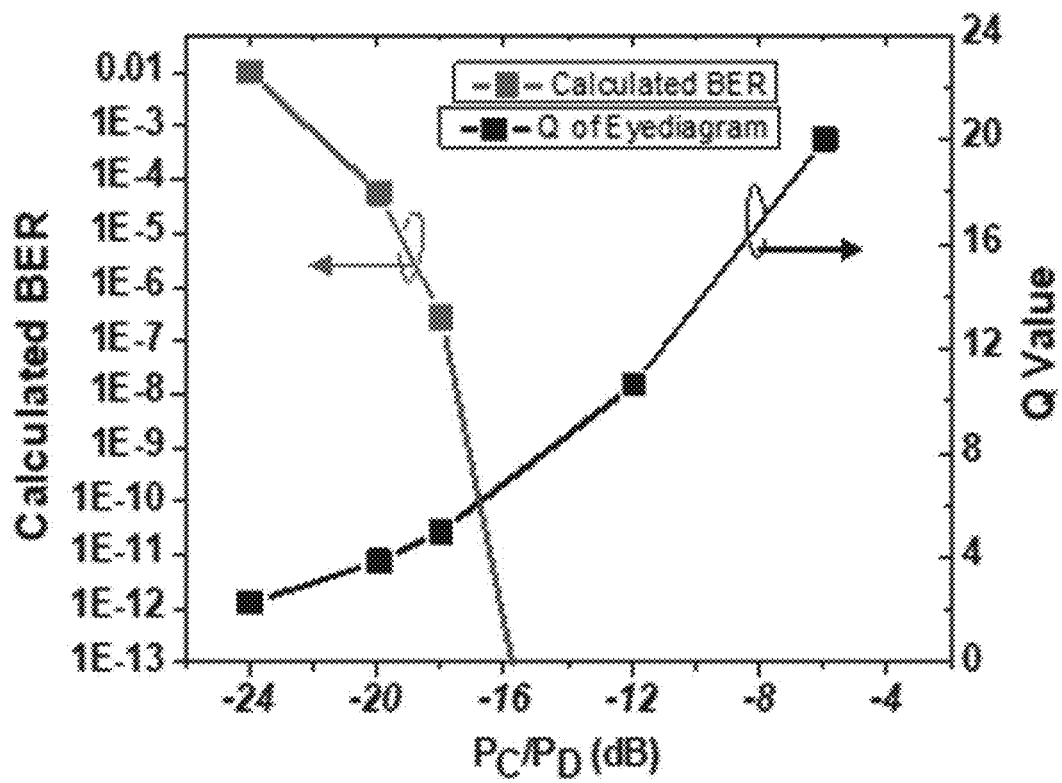
FIG. 14 is a graph plotting Q value of the eye diagram and calculated BER of the communication-channel signal as a function of power ratio $P_c/P_d$ of the communication-channel signal to the data-channel signal, for a communication-channel signal BER of $1\times10^{-3}$, in embodiments.

As the power ratio of $P_c/P_d$ increases, OOB communication-channel signal 128 has improved performance; conversely, reducing the power ratio of $P_c/P_d$ degrades the performance of OOB communication-channel signal 128. FIG. 14 is a graph plotting Q value of the eye diagram (e.g., eye diagram 1100, FIG. 11) and calculated BER of OOB communication-channel signal 128 as a function of power ratio $P_c/P_d$ of OOB communication-channel signal 128 to data-channel signal 126, for a communication-channel signal BER of $1\times10^{-3}$. Depending on the type of FEC used for OOB communication-channel signal 128, the dynamic range for the power ratio $P_c/P_d$ may differ. For example, where RS (255, 236) code is used for communication channel FEC, then the power ratio $P_c/P_d$ may be within −22 dB to −12 dB considering the performance of data-channel signal 126 as well as OOB communication-channel signal 128.

Guard band 706 is changed to test its effect on the performance of data-channel signal 126 and OOB communication-channel signal 128. The received optical power is maintained at −40.5 dBm, and the power ratio $P_c/P_d$ of OOB communication-channel signal 128 to data-channel signal 126 is maintained at −14.5 dB. Since data-channel signal 126 is broad-band and OOB communication-channel signal 128 is narrow-band, data-channel signal 126 is more tolerant of crosstalk as compared to the tolerance of OOB communication-channel signal 128 to crosstalk.

Figure 15:
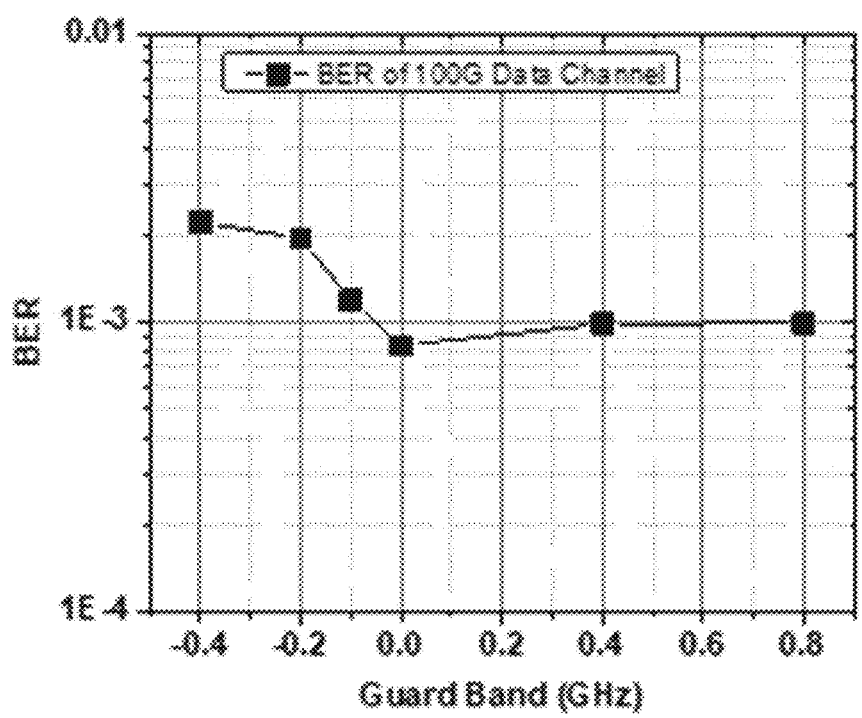
FIG. 15 is a graph showing the BER of the data-channel signal as a function of the guard band between the data-channel signal and the communication-channel signal, in embodiments.

FIG. 15 is a graph showing the BER of data-channel signal 126 as a function of the spectral width of guard band 706 between data-channel signal 126 and OOB communication-channel signal 128. In this example, data-channel signal 126 is simulated at 100G and OOB communication-channel signal 128 is simulates at 400 M.

Figure 16:
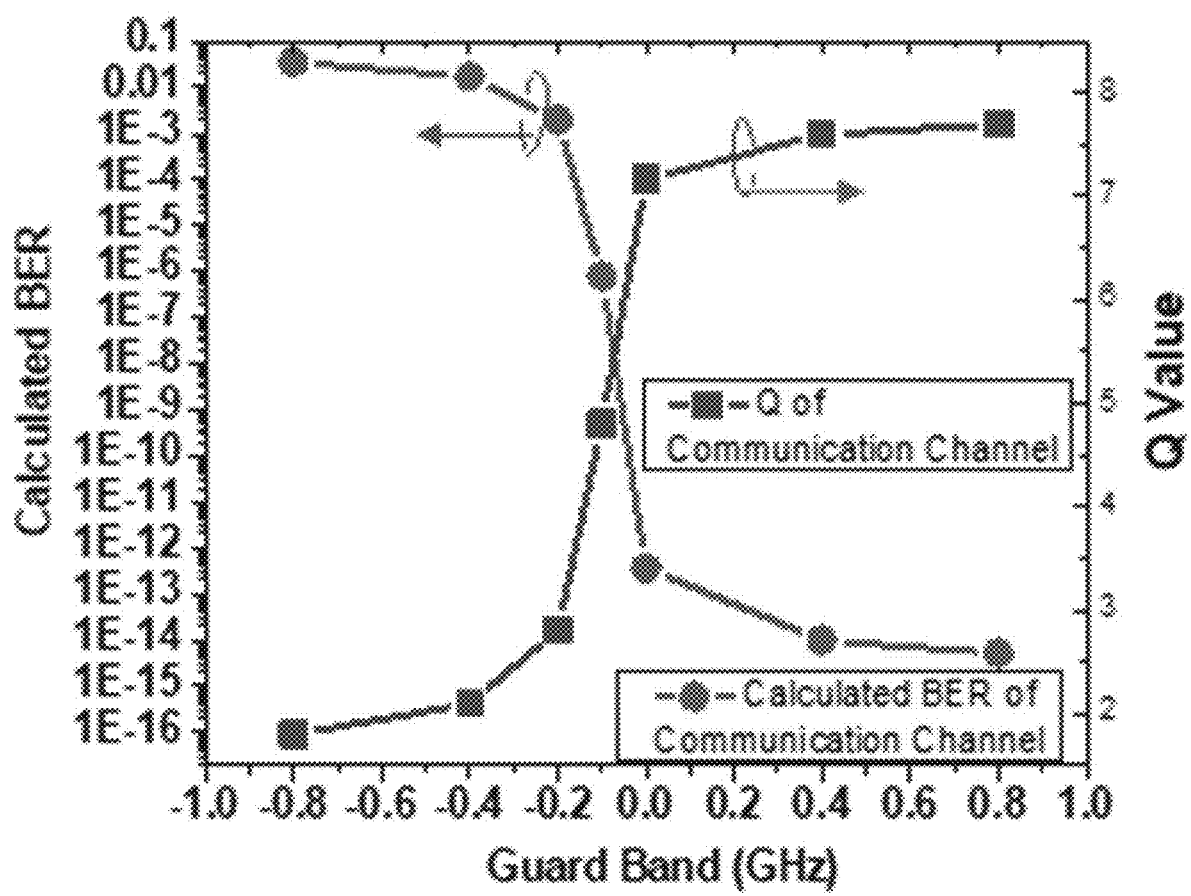
FIG. 16 is a graph showing the calculated BER of the data-channel signal and the Q value of the communication-channel signal as a function of the guard band between the data-channel signal and the communication-channel signal, in embodiments.

FIG. 16 is a graph showing the calculated BER of data-channel signal 126 and Q value of OOB communication-channel signal 128 as a function of guard band 706 between data-channel signal 126 and OOB communication-channel signal 128. FIG. 16 shows that OOB communication-channel signal 128 is more sensitive to the size of guard band 706 as compared to the sensitivity of data-channel signal 126 to the size of guard band 706. Therefore, a value of guard band 706 that protects the communication channel also protects the data channel. However, the component bandwidth should also be considered to ensure the communication channel is still within the detection bandwidth of the coherent receiver.

Figure 17A:
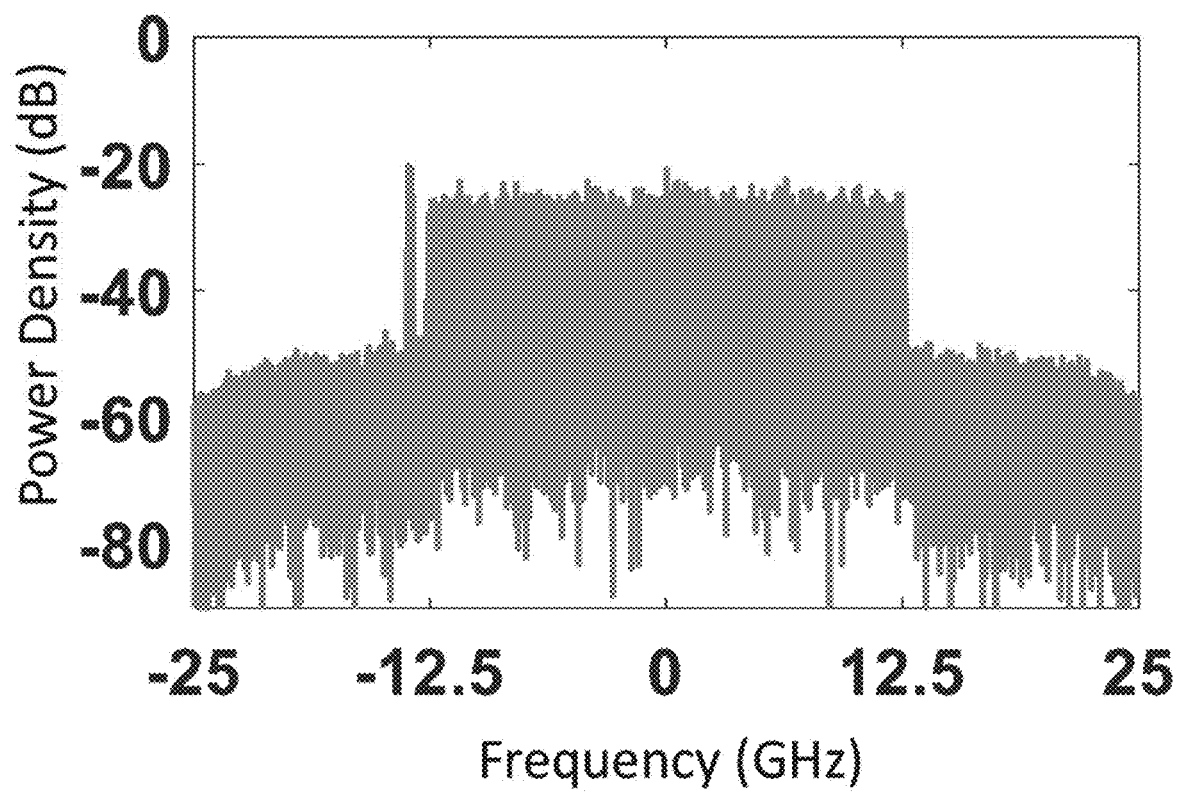
FIG. 17A shows one example power spectrum of the data-channel signal and the communication-channel signal with carrier suppression, in embodiments.
Figure 17B:
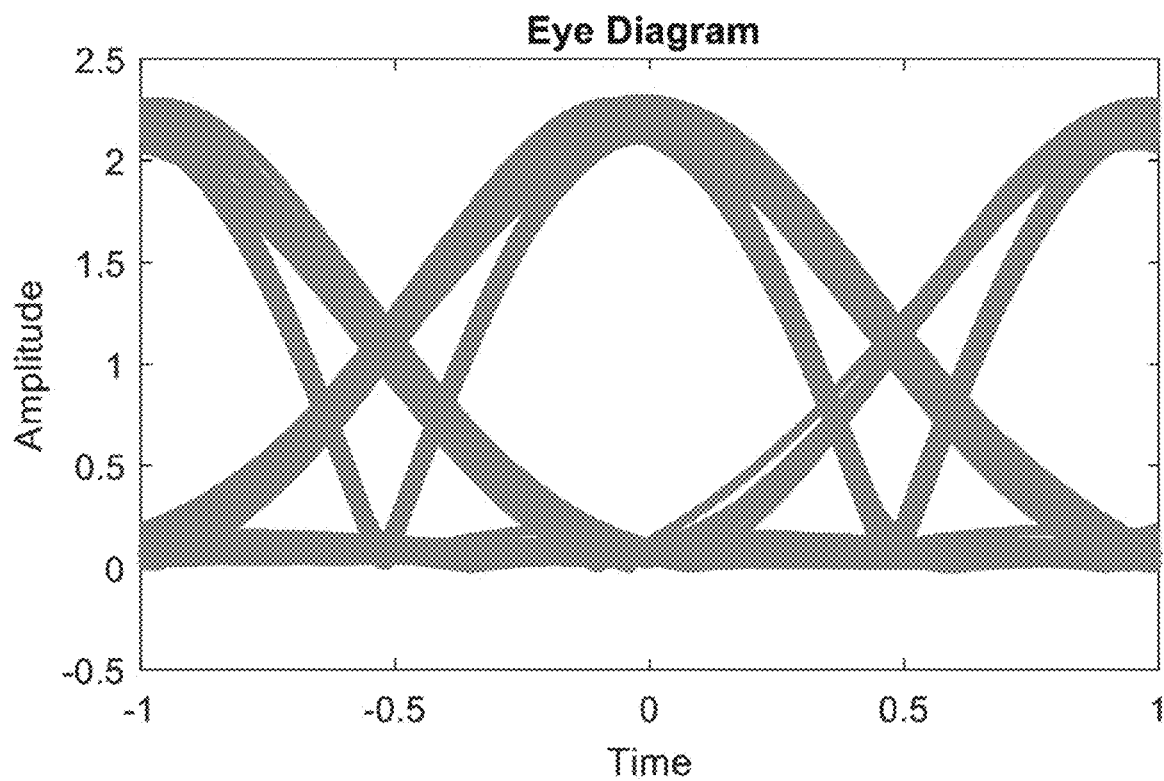
FIG. 17B shows an eye diagram, corresponding to FIG. 17A, of the communication-channel signal, in embodiments.

As unipolar coded NRZ has a bias voltage, there is an obvious carrier, spike 952, (due to unbalanced DC bias) in FIG. 9B for OOB communication-channel signal 128. In systems that are sensitive to carrier nonlinearity, it is preferable to avoid a strong carrier, as a strong carrier introduces high DC components an associated non-linearities. As an alternative, bipolar coded NRZ may be used to avoid the DC bias, by switching every second 1 bit to −1. This allows a carrier-suppressed communication channel with NRZ modulation to be achieved. FIG. 17A shows one example power spectrum of data-channel signal 126 OOB communication-channel signal 128 with carrier suppression, and FIG. 17B shows a corresponding eye diagram of OOB communication-channel signal 128. Clearly, compared with FIG. 9B, the peak power density of bipolar coded NRZ of OOB communication-channel signal 128 is greatly suppressed. The bipolar coded NRZ has a similar performance to regular NRZ in the linear system.

Figure 18:
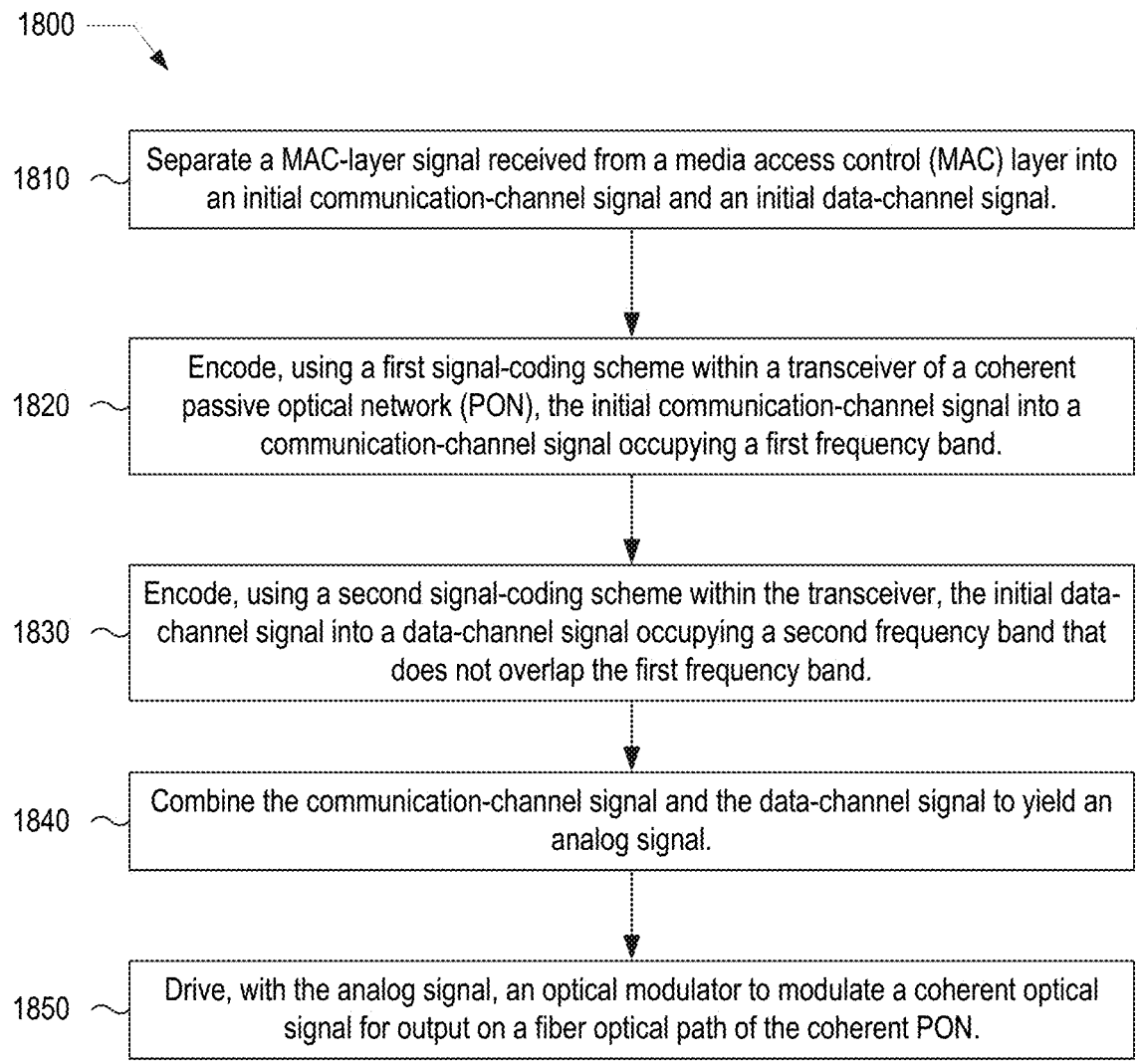
FIG. 18 is a flowchart illustrating a method for implementing an out-of-band communication channel in a coherent optical access network, in an embodiment.

FIG. 18 is a flowchart of an example method 1800 for implementing an out-of-band communication channel in a coherent optical access network. In some implementations, one or more process steps of FIG. 18 may be performed by an optical line terminal 140. For example, optical line terminal includes circuitry that controls the digital signal processor to execute steps of method 1800. In embodiments, the circuitry includes a memory storing instructions, that when executed by the digital signal processor, control the digital signal processor to execute method 1800. In embodiments, the circuitry includes one of a field-programmable gate array and an application-specific integrated circuit.

In some implementations, one or more process steps of FIG. 18 may be performed by another device or a group of devices separate from or including the optical line terminal 140. Additionally, or alternatively, one or more process steps of FIG. 18 may be performed by one or more components of device 100, such as processor 120, memory 130, storage component 140, input component 150, output component 160, and/or communication interface 170.

As shown in FIG. 18, method 1800 may include separating a MAC-layer signal received from a media access control (MAC) layer into an initial communication-channel signal and an initial data-channel signal (step 1810). For example, the optical line terminal 140 separates a MAC-layer signal received from a media access control (MAC) layer into communication-channel signal 156 and data-channel signal 158, as described above. In embodiments, method 1800 includes detecting the MAC-layer signal with a coherent detector.

As further shown in FIG. 18, method 1800 may include encoding, using a first signal-coding scheme within a transceiver of a coherent passive optical network (PON), the initial communication-channel signal into a communication-channel signal occupying a first frequency band (step 1820). For example, the optical line terminal 140 encodes, using a first signal-coding scheme within a transceiver of optical line terminal 140, communication-channel signal 158 into communication-channel signal 128 occupying a first frequency band, as described above.

As further shown in FIG. 18, method 1800 may include encoding, using a second signal-coding scheme within the transceiver, the initial data-channel signal into a data-channel signal occupying a second frequency band that does not overlap the first frequency band (step 1830). In an example of step 1830, the optical line terminal 140 encodes, using a second signal-coding scheme within the transceiver, initial data-channel signal 156 into data-channel signal 128 occupying a second frequency band that does not overlap the first frequency band, as described above.

In embodiments, steps 1820 and 1830 are executed by a same digital signal processor, e.g., DSP 120. The first signal-coding scheme may differ from the second signal-coding scheme. In embodiments, the communication-channel signal has a narrower spectral bandwidth than the data-channel signal. In embodiments, the initial data-channel signal is a digital signal, and step 1830 includes digitally encoding the initial data-channel signal.

As further shown in FIG. 18, method 1800 may include combining the communication-channel signal and the data-channel signal to yield an analog signal (step 1840). For example, the DSP 120 combines the communication-channel signal and the data-channel signal to yield signal 124.

As further shown in FIG. 18, method 1800 may include driving, with the analog signal, an optical modulator to modulate a coherent optical signal for output on a fiber optical path of the coherent PON (step 1850). For example, the optical line terminal 140 drives, with signal 124, an optical modulator of opto-electronics 144 to modulate carrier signal 143 from laser 142 for output on primary fiber cable 104.

Method 1800 may include additional implementations, such as any single implementation or any combination of implementations described below and/or in connection with one or more other processes described elsewhere herein.

In embodiments, method 1800 includes selecting a power ratio between the communication-channel signal and the data-channel signal to reduce a bit error rate of a communication channel of the communication-channel signal.

In a third implementation, step 1810 includes separating the MAC-layer signal into the initial communication-channel signal, the initial data-channel signal, and an additional initial communication-channel signal. In such embodiments, method 1800 also includes encoding, using a third signal-coding scheme within the transceiver, the additional initial communication-channel signal into an additional communication-channel signal occupying a third frequency band that overlaps neither the first frequency band nor the second frequency band. In such embodiments, step 1840 includes combining the communication-channel signal, the additional communication-channel signal, and the data-channel signal to yield the analog signal.

Although FIG. 18 shows example steps of method 1800, in some implementations, method 1800 may include additional steps, fewer steps, different steps, or differently arranged steps than those depicted in FIG. 18. Additionally, or alternatively, two or more of the steps of method 1800 may be performed in parallel.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for implementing an out-of-band communication channel in a coherent optical access network, comprising:
   separating a MAC-layer signal received from a media access control (MAC) layer into an initial communication-channel signal and an initial data-channel signal;
   encoding, using a first signal-coding scheme within a transceiver of a coherent passive optical network (PON), the initial communication-channel signal into a communication-channel signal occupying a first frequency band;
   encoding, using a second signal-coding scheme within the transceiver, the initial data-channel signal into a data-channel signal occupying a second frequency band that does not overlap the first frequency band;
   combining the communication-channel signal and the data-channel signal to yield an analog signal; and
   driving, with the analog signal, an optical modulator to modulate a coherent optical signal for output on a fiber optical path of the coherent PON.

2. The method of claim 1, the first signal-coding scheme differing from the second signal-coding scheme.

3. The method of claim 1, the communication-channel signal having a narrower spectral bandwidth than the data-channel signal.

4. The method of claim 1, further comprising selecting a guard band between the data-channel signal and the communication-channel signal to reduce crosstalk therebetween.

5. The method of claim 1, further comprising selecting a power ratio between the communication-channel signal and the data-channel signal to reduce a bit error rate of a communication channel of the communication-channel signal.

6. The method of claim 1, the steps of encoding being executed by a same digital signal processor.

7. The method of claim 1, the initial data-channel signal being a digital signal, and said encoding the initial data-channel signal comprising digitally encoding the initial data-channel signal.

8. The method of claim 1,
   separating comprising separating the MAC-layer signal into the initial communication-channel signal, the initial data-channel signal, and an additional initial communication-channel signal, and further comprising:
   encoding, using a third signal-coding scheme within the transceiver, the additional initial communication-channel signal into an additional communication-channel signal occupying a third frequency band that overlaps neither the first frequency band nor the second frequency band; and
   combining comprising combining the communication-channel signal, the additional communication-channel signal, and the data-channel signal to yield the analog signal.

9. The method of claim 1, the MAC layer signal including the initial communication-channel signal and the initial data-channel signal modulated thereon, and further comprising: detecting the MAC-layer signal with a coherent detector.

10. An optical line terminal comprising:
    a digital signal processor;
    circuitry that controls the digital signal processor to execute a plurality of steps including:
    separating a MAC-layer signal received from a media access control (MAC) layer into an initial communication-channel signal and an initial data-channel signal;
    encoding, using a first signal-coding scheme within a transceiver of a coherent passive optical network (PON), the initial communication-channel signal into a communication-channel signal occupying a first frequency band;
    encoding, using a second signal-coding scheme within the transceiver, the initial data-channel signal into a data-channel signal occupying a second frequency band that does not overlap the first frequency band;
    combining the communication-channel signal and the data-channel signal to yield an analog signal.

11. The optical network of claim 10, the circuitry including a memory storing instructions, that when executed by the digital signal processor, control the digital signal processor to execute the plurality of steps.

12. The optical network of claim 10, the circuitry including one of a field-programmable gate array and an application-specific integrated circuit.

13. The optical network of claim 10, further comprising a coherent detector that detects the MAC-layer signal.

* * * * *